United States Patent [19]

Mimura et al.

[11] 3,917,514

[45] Nov. 4, 1975

[54] PROCESS FOR PREPARING THE ANTIBIOTIC S 15-1

[75] Inventors: Akio Mimura; Masahiko Wada; Yoshiyuki Hashimoto; Katsuaki Tsuzuki; Takashi Iguchi; Takeshi Kawamura; Kei Arima, all of Tokyo, Japan

[73] Assignee: Asahi Kasei Kogyo Kabushiki Kaisha, Osaka, Japan

[22] Filed: Oct. 15, 1974

[21] Appl. No.: 514,342

[30] Foreign Application Priority Data
Oct. 26, 1973  Japan.............................. 48-120547

[52] U.S. Cl............................................... 195/80 R
[51] Int. Cl.² ......................................... C12D 9/14

[58] Field of Search ................................. 195/80 R

[56] References Cited
UNITED STATES PATENTS
3,814,795   6/1974   Arima et al...................... 424/116

Primary Examiner—Lionel M. Shapiro
Attorney, Agent, or Firm—Lawrence S. Levinson; Merle J. Smith; Stephen B. Davis

[57] ABSTRACT

The antibiotic S 15-1 is produced by culturing aerobically *Streptomyces sp.* HW-64 or HW-70 in a culture medium containing carbon and nitrogen sources until antibiotic S 15-1 is accumulated and then recovering the antibiotic from said medium.

4 Claims, No Drawings

PROCESS FOR PREPARING THE ANTIBIOTIC S 15-1

BACKGROUND OF THE INVENTION

The antibiotic S 15-1 as disclosed in U.S. Pat. No. 3,814,795 to Arima et al. (Japanese Pat. Application No. 77,803/70) inhibits the growth of gram-positive, gram-negative, and acid fast bacteria. When the antibiotic is used at a high concentration, it inhibits the growth of molds, yeasts and the like fungi. Furthermore, the antibiotic inhibits the growth in tissue culture of virus such as Newcastle disease virus.

SUMMARY OF THE INVENTION

This invention is directed to the production of the antibiotic S 15-1 in high yield by means of two novel strains belonging to the genus Streptomyces.

DETAILED DESCRIPTION OF THE INVENTION

The microorganisms used in the present invention are strains belonging to the genus Streptomyces which were isolated by the inventors from soil. The two strains (denominated as Streptomyces sp. HW-64 and HW-70, respectively) having the mycological properties described below, have been deposited as Nos. 2300 and 2301, respectively, at the Fermentation Research Institute, Agency of Industrial Science and Technology, Chiba City, Japan. A sample of these microorganisms can be obtained from the aforementioned Institute.

I. Morphological Characteristics

| Strain | HW-64 | HW-70 |
|---|---|---|
| Vegetative mycelium | Finely branched. | Extremely good growth; finely branched. |
| Aerial mycelium | Abundant growth, long filaments, branched, a few in the form of hooks. No whorls or spirals. | Scant growth on organic media. Gradually formed at the latter stage (about 10 days) of culture; long filaments, well branched. No whorls or spirals. |
| Spores | More than 10 spores interconnected on tip of aerial hypha. Oval to ellipsoidal (0.7 by 1.2 microns). | Very scant spore formation. More than 10 spores (if formed) interconnected on tip of aerial hypha. Oval (0.8 by 1.2 microns). |

II. Behaviors On Various Media

| | HW-64 | HW-70 |
|---|---|---|
| Czapek-Dox's agar plate (at 26°C) | Growth good, colorless or somewhat white colored. Aerial mycelium white, no soluble pigment. | Growth cream-colored transparent. Aerial mycelium white, no soluble pigment. |
| Glucose-asparagine agar plate (at 26°C) | Growth colorless transparent; white paste aerial mycelium; no soluble pigment. | Growth yellowish transparent; white paste aerial hypha; no soluble dye. |
| Starch agar plate (at 26°C) | Growth colorless to slightly white; whitish transparent aerial mycelium. No soluble pigment; starch is hydrolyzed. | Growth colorless to white; white transparent aerial mycelium. No soluble pigment; starch is hydrolyzed. |
| Sodium nitrate-peptone solution (at 30°C) | Growth white, with adhesion to tube wall, agglomeration at liquid bottom and formation of white skin pattern at liquid surface. No soluble pigment. Nitrates are reduced to nitrites. | Growth white, with adhesion to tube wall and agglomeration at liquid bottom. Poor growth at liquid surface. No soluble pigment. Nitrates are reduced to nitrites. |
| Bouillon agar plate (at 26°C) | Growth grayish yellow, raised; surface gradually covered with grayish white aerial mycelium. Dark brown soluble pigment. | Growth grayish yellow, raised; scant grayish white aerial mycelium. Dark brown soluble pigment. |
| Glucose-incorporated bouillon agar plate (at 26°C) | Growth grayish yellow; much wrinkled, raised; grayish white aerial mycelium. Dark brown soluble pigment. | Growth grayish yellow tinged with blue, much wrinkled, raised; scant grayish white aerial mycelium. Bluish dark brown soluble pigment. |
| Bennett's agar plate (at 26°C) | Growth pale white, raised; grayish white to pinkish purple thick aerial mycelium. Brown soluble pigment. | Growth yellow, wrinkled, raised; no aerial mycelium. Soluble pigment dark brown tinged with bluish green. |
| Gelatin stab (at 22°C) | Growth cream colored to yellowish brown; large quantities of white mycelium at stab portion; liquid portion crateri-form. No soluble pigment. | Growth cream colored to yellowish brown; white mycelium at stab portion; liquid portion crateri-form. No soluble pigment. |
| Litmus milk (at 30°C) | Growth cream colored to brown ring; greenish cream colored mycelium; peptonized; clarified from upper layer portion; | Growth cream colored to brown ring; greenish cream colored mycelium; peptonized; clarified from upper layer portion; white sediment at |

II. Behaviors On Various Media

|  | HW-64 | HW-70 |
|---|---|---|
|  | white sediment at liquid bottom. Brown soluble pigment. | liquid bottom. Brown soluble pigment. |
| Potato ground solution (at 26°C) | Growth yellowish brown ring; white mycelium; liquid surface white, flocculant. Brown soluble pigment. | Growth yellowish brown ring; poor growth. |
| Tyrosine agar slant (at 26°C) | Growth grayish yellow, much wrinkled. Dark brown soluble pigment. Tyrosine is decomposed. | Growth grayish yellow, much wrinkled. Dark brown soluble pigment. Tyrosine is decomposed. |

III. Physiological Properties

|  |  | HW-64 | HW-70 |
|---|---|---|---|
| (1) | Nitrite formation reaction | + | + (strong) |
| (2) | Coagulation on skim milk | − | − |
| (3) | Peptonization on skim milk | + | + |
| (4) | Starch hydrolysis | + | + |
| (5) | Gelatin liquefaction | + | + |
| (6) | Tyrosinase formation reaction | + | + (strong) |
| (7) | Growth temperature | 12–32°C | 10–32°C |
|  | Optimum temperature | 25–28°C | 25–28°C |

IV. Utilization of Carbon Sources
(Cultured in Pridham and Gottleib medium at 26°C for 14 days)

|  | HW-64 | HW-70 |
|---|---|---|
| Glucose | + | + |
| Fructose | + | + |
| Maltose | + | + |
| Xylose | + | + |
| Mannose | + | + |
| L-Arabinose | + | + |
| Soluble starch | + | + |
| Dextrin | + | + |
| Glycerol | + | + |
| Galactose | − | + |
| Lactose | − | + |
| Sodium succinate | (−) | + |
| Ethanol | − | − |
| Raffinose | − | − |
| Inulin | − | − |
| Mannitol | − | − |
| Sorbitol | − | − |
| Inositol | − | − |
| Sodium acetate | (−) | (−) |
| Sodium citrate | (−) | (−) |
| D-Arabinose | (−) | (−) |
| Trehalose | (−) | (−) |
| Saccharose | (−) | (−) |

(Note) +: Utilization positive
−: Utilization negative
(−): Utilization doubtful From these results, it is determined that the newly isolated strains HW-64 and HW-70 have the following characteristics:

1. The strains develop filamentous and branched aerial mycelium free from whorls or spirals, and form flat, smooth and interconnected spores of oval to ellipsoidal form. Particularly on organic media, however, the strain HW-70 forms no or scant aerial mycelium and spores.

2. Generally, the strains develop grayish white to pinkish purple aerial mycelium. On organic media, the strains produce pale brown to bluish brown soluble pigments, and therefore belong to the chromogenic group. On synthetic media, they show colorless to cream-colored growth and produce no soluble pigment.

3. As to the physiological properties, the strain HW-70 is particularly marked in nitrite formation reaction and tyrosinase activity.

4. The strains utilize carbon sources of wide scope, and the strain HW-70 can utilize galactose and lactose as well.

5. The strains produce, as described below, the antibiotic S 15-1.

When compared with the strains described in Bergy's Manual of Determinative Bacteriology, Seventh Edition, it is clear that the strains HW-64 and HW-70 belong to the genus Streptomyces. The following strains are relatively similar to the strains HW-64 and HW-70 on the basis of such characteristics, *Streptomyces cinnamonensis*, *Streptomyces antibioticus*, *Streptomyces griseocarneus* and the *Streptomyces griseocarneus* S 15-1 strain disclosed in U.S. Pat. No. 3,814,795.

Among these strains, *Streptomyces cinnamonensis* differs from the strains HW-64 and HW-70 in that it develops a brown to scarlet aerial mycelium on glucose-asparagine agar, has no nitrate-reducing ability, and shows no gelatin liquefaction. *Streptomyces antibioticus* differs from said strains in that it shows thin brown growth on bouillon agar, develops a grayish yellow to yellowish green aerial mycelium, and has no peptonization action on skim milk. *Streptomyces griseocarneus* differs from said strains in that it shows cream-colored growth on bouillon agar, develops no aerial mycelium and has no nitrate-reducing ability, and also in the scope of utilization of carbon compounds. Further, the *Streptomyces griseocarneous* S 15-1 strain differs from said strains in that it develops no aerial mycelium on bouillon agar, develops no greenish cream-colored mycelium on milk medium, and shows colorless to pale brown growth on gelatin medium to produce a pale brown soluble pigment. In addition, the *Streptomyces griseocarneous* S 15-1 strain differs from the strain HW-70 in that on a Bennett's medium, the former develops a pinkish gray thick aerial mycelium whereas the latter develops no aerial mycelium, that on a glucose-incorporated bouillon agar medium, the former shows grayish yellow growth to produce a pale brown soluble pigment whereas the latter shows bluish growth to produce a bluish dark brown soluble pigment, and that the latter is broader in scope of carbon source utilization.

In the present invention, the antibiotic S 15-1 is prepared by culturing either *Streptomyces sp.* HW-64 or *Streptomyces sp.* HW-70 in a liquid medium containing a carbon source and a nitrogen source. Suitable carbon sources include glucose, starch, dextrin, glycerin and the like and suitable nitrogen sources include soybean meal, meat extract, peptone, corn steep liquor, hydrolyzed casein, sodium nitrate, ammonium sulfate, urea, and the like. The medium also contains various inorganic salts such as potassium phosphate, potassium chloride, magnesium sulfate, ferrous sulfate, etc. The medium may also include organic compounds such as citric acid or succinic acid or inorganic compounds such as manganese sulfate or calcium chloride which promote the production of the antibiotic S 15-1. In addition a suitable defoaming agent such as soybean oil or silicon can be included in the medium.

The antibiotic S 15-1 is produced by shaking culture or agitation-aeration stirring culture method using the liquid medium described above. The cultivation temperature is optimumly from about 25° to about 28°C, and the maximum titre can be attained in from about 2 to 3 days cultivation.

Antibiotic S 15-1 in the culture medium is extracted by separating impurities according to the method disclosed in U.S. Pat. No. 3,814,795 and then concentrating the effective substance. That is, the antibiotic S 15-1 produced by cultivation is recovered as a base or salt from the culture filtrate according to, for example, the following procedures.

The antibiotic S 15-1 is absorbed on a cation exchange resin as Amberlite IRC-50 (H-form), washed with water, eluted with a dilute acid, freed from excess acid by means of Amberlite IR-45 (OH-form), condensed and then lyophilized. The resulting crude powder is extracted with methanol, and the extract is condensed and incorporated with a large amount of acetone to precipitate the antibiotic S 15-1 as a hydrochloride. This hydrochloride is subjected to cellulose column chromatography by use of an acetic acid-containing solvent, and the resulting active fractions are condensed and then lyophilized to obtain a powder (acetate). The thus obtained powder is converted into a hydrochloride or sulfate by use of an ion exchange resin (H-form). Alternatively, the above-mentioned acetate is treated with a weakly basic ion exchange resin, whereby the antibiotic S 15-1 can be isolated as a free base. The hydrochloride, base, and sulfate obtained according to the above-mentioned procedures are white powders. The thus obtained substances have melting points of 161° to 162°C. (decomposition to yellow), and are entirely identical with the antibiotic S 15-1 disclosed in U.S. Pat. No. 3,814,795.

Elementary analysis values of the substances are as follows:

Product obtained by use of the strain HW-64:

C 44.07%, H 7.25%, N 17.04%

Product obtained by use of the strain HW-70:

C 43.58%, H 7.21%, N 16.95%

On the other hand, elementary analysis values of the antibiotic S 15-1 disclosed in the aforesaid 3,814,795 are as follows:

C 43.32%, H 7.13%, N 17.29%.

Thus, the elementary analysis values of the two products according to the present invention coincide with those of the antibiotic S 15-1 disclosed in U.S. Pat. No. 3,814,795.

The substances obtained from the use of HW-64 and HW-70 are very soluble in water and methanol, and insoluble in such organic solvents as acetone, ethyl acetate, chloroform, ether and benzene. As to color reactions, the said substances are positive in ninhydrin, Fehling, Elson-Morgan, Molisch, silver mirror, anthrone, Sakaguchi and maltol reactions, and negative in biuret and orcinol reactions. Further, the results of thin layer chromatography of the white powders obtained according to the present process and the antibiotic S 15-1 disclosed in U.S. Pat. No. 3,814,795 are as shown in Table I below.

Table I

| Developer | HW-64 | HW-70 | S 15-1 |
|---|---|---|---|
| Aqueous saturated butanol | 0.0 | 0.0 | 0.0 |
| Aqueous 3% ammonium chloride solution | 0.80 | 0.78 | 0.80 |
| 80% Phenol solution | 0.03 | 0.03 | 0.03 |
| 80% Phenol solution (in ammonia current) | 0.94 | 0.93 | 0.94 |
| 50% Acetone solution | 0.07 | 0.07 | 0.07 |
| n-Butanol : Methanol : Water : Methyl Orange (40 cc : 10 cc : 20 cc : 1.5 g) | 0.73 | 0.72 | 0.72 |
| n-Butanol : Methanol : Water (40 cc : 10 cc : 20 cc) | 0.0 | 0.0 | 0.0 |
| Benzene : Methanol (4 : 1 by volume) | 0.03 | 0.03 | 0.03 |
| Distilled water | 0.05 | 0.05 | 0.05 |
| n-Propanol : Pyridine : Acetic acid : Water (15 : 10 : 3 : 2 by volume) | 0.42 | 0.41 | 0.40 |
| n-Butanol : Pyridine : p-Toluene-sulfonic acid (98 cc : 2 cc : 2 g) | 0.0 | 0.0 | 0.0 |

Table 2 shows antimicrobial spectra of the same substances as set forth in Table 1 against various microorganisms. (According to dilution method using an ordinary nutrient agar medium.)

Table 2

| Test microorganisms | Minimum inhibitory concentration (mcg/ml) | | |
|---|---|---|---|
| | HW-64 | HW-70 | S 15-1 |
| *Escherichia coli* K-12 | 4.25 | 3.92 | 3.65 |
| *Arthrobacter ureafaciens* IAM 1658 | 3.18 | 2.94 | 2.76 |
| *Pseudomonas aeruginosa* IFO 3080 | > 50 | > 50 | > 50 |
| *Pseudomonas aeruginosa* IFO 3448 | > 50 | > 50 | > 50 |
| *Staphylococcus aureus* FDA 209P | 1.06 | 0.98 | 0.92 |
| *Bacillus subtilis* PCI 219 | 1.06 | 0.98 | 0.92 |
| *Bacillus cereus* IFO 3466 | 26.0 | 25.0 | 25.0 |
| *Sarcina lutea* IFO 3232 | 4.25 | 2.94 | 2.76 |
| *Candida albicans* IAM 4888 | 50.0 | 50.0 | 50.0 |
| *Saccharomyces cerevisiae* IFO 0308 | > 50 | > 50 | 50.0 |
| *Aspergillus niger* ATCC 6275 | > 50 | > 50 | > 50 |
| *Penicillium chrysogenum* IFO 4626 | 25.0 | 25.0 | 30.0 |
| *Mycobacterium smegmatis* IFO 3083 | 10.60 | 9.80 | 9.20 |

From the above, it is evident that the antibiotic obtained according to the present invention is identical with the antibiotic S 15-1 disclosed in U.S. Pat. No. 3,814,795.

The present invention is illustrated in further detail below with reference to the examples, but it is needless to say that many other modifications of the procedures described in the examples are possible within the scope of the invention. In the examples, all percentages (%) are by weight unless otherwise specified. The purity of each product was determined according to a biochemical process using *Bacillus subtilis* PCI 219.

EXAMPLE 1

*Streptomyces sp.* HW-70 was inoculated to a Bennett's agar slant and cultured at 26°C. for 5 days. On the other hand, 100 ml. of a liquid medium (pH 6.5) containing 3.0 percent of starch, 2.0 percent of peptone, 0.2 percent of potassium secondary phosphate, 0.1 percent of potassium chloride, 0.1 percent (including water of crystallization) of magnesium sulfate (heptahydrate) and 0.002 percent (including water of crystallization) of ferrous sulfate (heptahydrate) was charged into a 500 ml. shaking flask and sterilized at 120°C. for 20 minutes. One platinum loop of the aforesaid slant culture was inoculated to the above-mentioned flask and reciprocally shaken at 28°C. for 48 hours to prepare a seed culture. 0.5 Liter of this seed culture was inoculated to a 20 liter-jar fermentor containing 10 liters of a liquid medium (pH 6.5) comprising 1.0 percent of starch, 3.0 percent of soybean meal, 0.65 percent of potassium nitrate, 0.4 percent of potassium secondary phosphate, 0.2 percent (including water of crystallization) of magnesium sulfate (heptahydrate), 0.002 percent (including water of crystallization) of ferrous sulfate and 0.04 percent of silicone. The medium had been previously sterilized at 120°C. for 60 minutes. The seed culture was cultured at 28°C. while introducing sterile air in an amount equal to the volume of the medium per minute and while stirring the system at 550 r.p.m. The titre of the culture was measured according to an ordinary biological assay using *Bacillus subtilis* PCI 219 as a test microorganism.

| Cultivation time | 40 hrs. | 60 hrs. | 80 hrs. | 100 hrs. |
|---|---|---|---|---|
| Titre of S 15-1 (mcg/ml) | 1,950 | 3,800 | 5,300 | 5,800 |

7.0 Liters of the culture after 100 hours' cultivation was adjusted to a pH of 6.0 by addition of 11N-hydrochloric acid and then filtered to obtain 6.4 liters of culture filtrate. The culture filtrate was adjusted to a pH of 7.0, absorbed on a column comprising 5 liters of Amberlite IRC-50 (H-form), washed with water, and then eluted with 0.1N-hydrochloric acid. The resulting active fractions (7.0 liters) were neutralized with Amberlite IR-45 (OH-form), condensed and then lyophilized to obtain a crude powder. The crude powder was extracted with 0.5 liter of methanol, and the extract was mixed with 3.5 liters of acetone to form a white precipitate. This precipitate was recovered and dried to obtain 26.5 g. of a white powder (purity 65 percent). Subsequently, 5.0 g. of the white powder was dissolved in a small amount of water, subjected to cellulose column chromatography using a column packed with 1 kg. of a cellulose powder, and eluted with a developer comprising n-propanol, pyridine, acetic acid and water in a volumne ration of 15 : 10 : 13 : 12. The resulting active fractions were collected and then condensed to remove the developer, and the condensed liquid was lyophilized. This hygroscopic powder was dissolved in water, passed through Amberlite IR-45 (OH-form) to completely remove the acetic acid, neutralized with hydrochloric acid and then lyophilized to obtain 1.02 g. of a white powder (purity 98 percent).

EXAMPLE 2

*Streptomyces sp.* HW-64 was cultured for 80 hours under entirely the same conditions as in Example 1 to obtain the following results:

| Cultivation time | 40 hrs. | 60 hrs. | 80 hrs. |
|---|---|---|---|
| Titre of S 15-1 (mcg/ml) | 1,000 | 1,980 | 2,460 |

6.2 Liters of the culture filtrate was treated in the same manner as in Example 1 to obtain 11.7 g. of a white powder (purity 58 percent).

What is claimed is:

1. A process of preparing the antibiotic S 15-1 which comprises culturing *Streptomyces sp.* HW-64 or *Streptomyces sp.* HW-70 in a culture medium containing sources of carbon, nitrogen and inorganic salts until a sufficient amount of the antibiotic has been imparted in the medium and recovering the antibiotic from the medium.

2. A process according to claim 1 wherein culturing is conducted at a temperature of from about 25° to about 28°C.

3. A process according to claim 2 wherein the microorganism cultured is *Streptomyces sp.* HW-64.

4. A process according to claim 2 wherein the microorganism cultured is *Streptomyces sp.* HW-70.

* * * * *